United States Patent
Subramaniam et al.

(10) Patent No.: US 10,853,001 B1
(45) Date of Patent: Dec. 1, 2020

(54) METHODS AND SYSTEMS FOR AUTOMATICALLY SELECTING ONE OR MORE FILES FOR PRINTING BASED ON USER'S CHOICES

(71) Applicant: XEROX CORPORATION, Norwalk, CT (US)

(72) Inventors: Kalai Selvi Subramaniam, Tirupur Dt. (IN); Kavin Kumar Gurusamy, Erode (IN); Ramanathan Arunachalam, Chennai (IN)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 16/555,158

(22) Filed: Aug. 29, 2019

(51) Int. Cl.
*G06F 3/12* (2006.01)

(52) U.S. Cl.
CPC ............ *G06F 3/1204* (2013.01); *G06F 3/126* (2013.01); *G06F 3/1271* (2013.01)

(58) Field of Classification Search
CPC ...... G06F 3/1204; G06F 3/126; G06F 3/1271; G06F 16/168; G06F 3/0481; H04L 41/22; H04L 51/02
See application file for complete search history.

(56) References Cited

U.S. PATENT DOCUMENTS

| 2002/0103860 A1* | 8/2002 | Terada | G06Q 30/04 709/203 |
| 2006/0288304 A1* | 12/2006 | Nomoto | G06F 16/168 715/781 |

\* cited by examiner

*Primary Examiner* — Iriana Cruz

(57) ABSTRACT

A method of selecting a file for printing is disclosed. The method includes receiving a selection of a folder, the folder includes a plurality of files and at least one file to be printed. A pre-defined option is displayed to select the at least one file for printing based on a choice of the user. Upon selection, one or more choice options are displayed. The user provides one or more choice inputs corresponding to the choice options. Then, the choice inputs provided by the user are received. One or more files are automatically identified and automatically selected based on the choice inputs by searching in the plurality of files. The one or more automatically selected files along with other non-selected files present in the folder are displayed. The user is prompted to confirm the automatically selected files for printing. Upon confirmation, the automatically selected files are sent for printing.

18 Claims, 11 Drawing Sheets

METHODS AND SYSTEMS FOR AUTOMATICALLY SELECTING ONE OR MORE FILES FOR PRINTING BASED ON USER'S CHOICES

TECHNICAL FIELD

The presently disclosed subject matter relates to the field of printing, and more particularly to methods and systems for automatically selecting and printing one or more files from a folder based on user's choice.

BACKGROUND

These days people extensively use multi-function devices (MFD) like printing devices, etc., for printing, scanning, photocopying, and so forth in their offices, homes. Typically, one or more files that a user wants to print are placed in a folder. The folder may include multiple files of the same user, different users, different file types, files with different content and so on. Currently, when the user wants to print a file or multiple files of a particular user, in such cases, the user has to search and manually select the particular user's file and then print using a printer or a multi-function device. Similarly, when the user has to print different files of same file type, or different user files containing a specific keyword such as "certificate," then again the user has to manually search, select, or sort and put the files to be printed in a separate folder and then give a print command for printing the selected files. These are two case scenarios, there can be other scenarios when the user wants to print multiple files having same content type, same file type, all files of a single user, different user files containing a specific keyword, many types of files or different files of different users. This workaround for printing files from the folder selectively based on user's choice requires lot of manual effort and time of the user.

Currently, there exist no convenient solution and the user has to manually search and sort the files from multiple files or print them all together. These solutions may not be quite feasible due to different file names used. There are other solutions available, but those solutions may allow the user to print only files that are modified today or created by some specific author and do not address above mentioned scenarios. Hence, in light of the limitations, there arises a need for improvised and a simplified solution enabling a user to select files based on his choice/requirements without much effort and time.

SUMMARY

According to aspects illustrated herein, a method of selecting a file for printing is disclosed. The method includes receiving a folder from a user, the folder includes a plurality of files and at least one file to be printed by the user. Then, a selection of the plurality of files present in the folder and a print command, is received. Thereafter, a pre-defined option is displayed to select the at least one file for printing based on a choice of the user, via a user interface. Upon selection of the pre-defined option, one or more choice options are displayed to the user via the user interface. The user provides one or more choice inputs corresponding to the one or more choice options. Then, the one or more choice inputs provided by the user are received. Then, one or more files are automatically identified and automatically selected based on the one or more choice inputs by searching in the plurality of files present in the folder. The one or more automatically selected files along with other non-selected files present in the folder are displayed, via the user interface. The user is prompted to confirm the one or more automatically selected files for printing, wherein the user provides a confirmation input for printing based on the review of the one or more automatically selected files. Upon confirmation, the one or more automatically selected files are sent for printing to a printer. In this manner, the method enables the user to print the at least one file from the folder having the plurality of files, without requiring manual search and selection of the at least one file to be printed.

According to further aspects illustrated herein, a print driver running on a computing device for automatically selecting at least one file of user's choice from a folder for printing, is disclosed. The print driver is to receive a selection of the folder from the user, the folder includes a plurality of files and the at least one file to be printed by the user; receive a selection of the plurality of files present in the folder and a print command from the user; display a pre-defined option to select files by choice to the user; display one or more user choice options to the user based on a selection of the pre-defined option, wherein the user provides one or more choice inputs corresponding to the one or more choice options; receive the one or more choice inputs provided by the user; automatically identify and automatically select one or more files based on the one or more choice inputs by searching in the plurality of files present in the folder; display the one or more automatically selected files along with other non-selected files present in the folder; prompt the user to confirm the one or more automatically selected files for printing, wherein the user provides a confirmation input for printing based on the review of the one or more automatically selected files; and upon confirmation, send the one or more automatically selected files for printing to a printer.

According to additional aspects illustrated herein, a user interface for automatically selecting multiple files of user's choice from a folder for printing, is disclosed. The user interface is to receive a selection of the folder from the user, the folder includes a plurality of files and one or more files to be printed by the user; display a pre-defined option to select files by choice to the user; display one or more choice options to the user based on a selection of the pre-defined option, wherein the user provides one or more choice inputs corresponding to the one or more choice options; receive the one or more choice inputs provided by the user; automatically identify and select the one or more files based on the one or more choice inputs by searching in the plurality of files present in the folder; display the one or more automatically selected files along with other non-selected files present in the folder; prompt the user to confirm the one or more automatically selected files for printing, wherein the user provides a confirmation input for printing based on the review of the one or more automatically selected files; and upon confirmation, send the one or more automatically selected files for printing to a printer.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIG. 6A shows an exemplary snapshot according to the existing solutions, while

DESCRIPTION

Figure 1A:
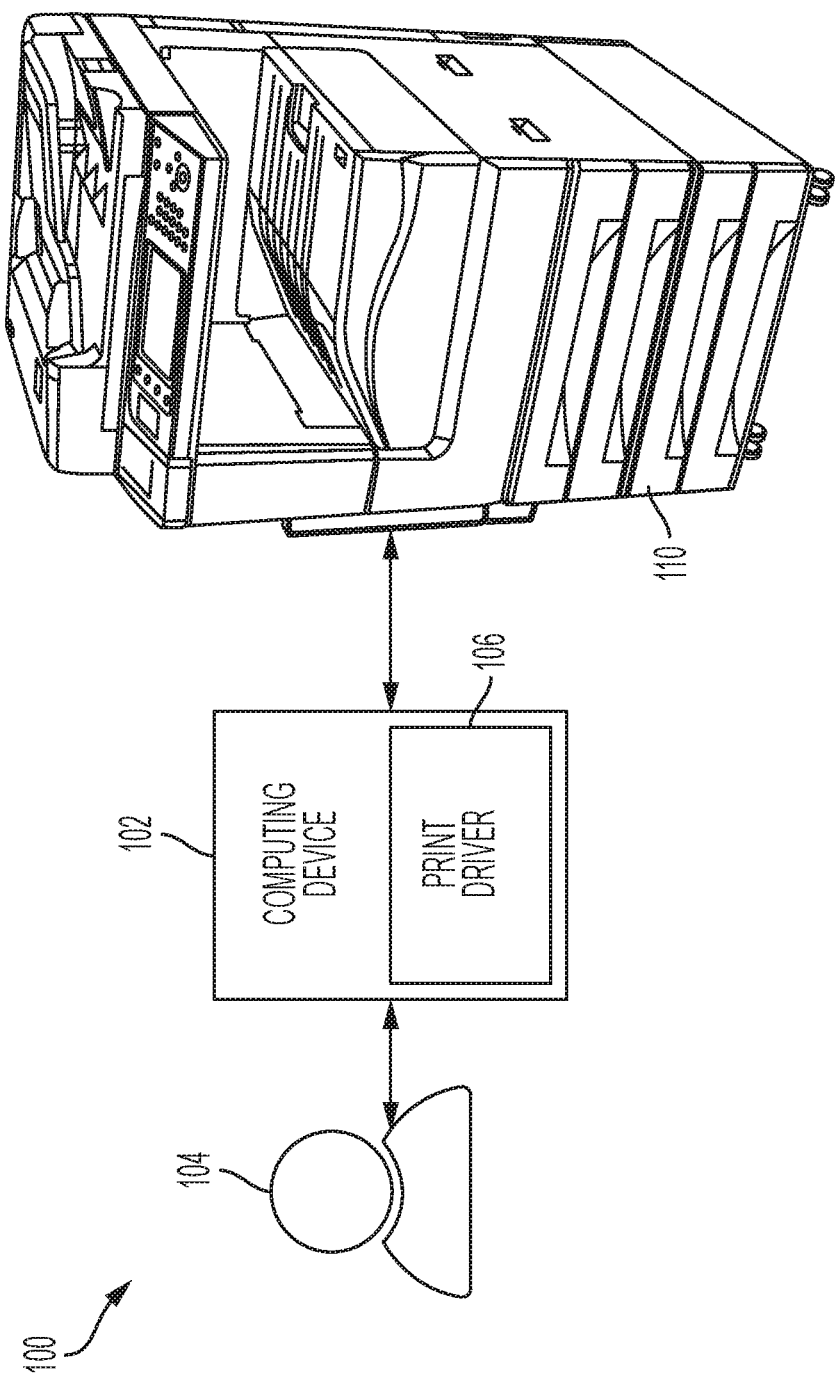
FIGS. 1A-1B show exemplary environments in which various embodiments of the disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below.

A "printer" is a single device or a combination of multiple devices to perform printing or other functions. The printer may include software, hardware, firmware, and combination thereof. In the context of the current disclosure, the printer prints files that are automatically selected at user's end. In other scenarios, the printer automatically selects one or more files from a folder for printing based on user's choice and prints the automatically selected files.

A "file" represents any document in a suitable format such as, PDF, word document, excel sheet, image, Microsoft presentation (.ppt), and so forth. The file can be in a virtual or software form (embodied in a software file). The virtual form can also be referred to as digital form, electronic version or the like. The file may include content in the form of text, image, graphics or a combination thereof. The output of the file (i.e., after printing) represents in a physical form, such as printed on paper. The relevant files include files that are identified based on user choice's and/or requirement.

The term "folder" refers to a set of files identified by a name. The folder may include a plurality of files and/or one or more sub-folders having a plurality of files.

The term "computing device" refers to a user device that the user typically uses for day-to-day tasks such as giving print commands and/or for receiving scanned documents. Examples of the computing device include, but are not limited to, a personal computer, a laptop, a mobile phone, a tablet, PDA, a smart-phone or any other device capable of data communication. A print driver runs on the computing device enabling the user to print one or more files without manual searching and selection. In context of the present disclosure, the print driver automatically selects the one or more files from a folder based on his choice and/or requirements. The print driver includes a pre-defined option enabling the user to select files according to his choice and/or requirements.

The term "choice options" include options allow the user to select files based on various parameters. The choice options may be "select file by keyword," "select file by date," "select file by size," "select file by type," "select file by a condition," and so on. The user can select one or more choice options. The term "choice input" refers to an input provided by the user, based on which files are automatically identified/shortlisted and automatically selected for printing. The choice input may include a keyword, a date, a size, a type of file, a condition, and so forth.

The term "user" refers to any user who wishes to print one or more files according to the present disclosure. The user can access the computing device and/or the printer. The files for printing may belong to the user or may belong to other users, without limiting the scope of the disclosure.

A "user interface" refers to any interface that allows the user to automatically select files based on his choices. The user interface allows the user to provide choice inputs based on which the files are identified (searched) and shortlisted. The user interface may have other functionalities to enable the user to automatically select files for printing and the same will be discussed below in detail. The user interface may be of the print driver or may be of the printer or any other device.

Overview

The present disclosure tackle scenarios when a user wants to submit multiple files or a single file present in a folder having multiple files for printing, without requiring any manual effort and time from the user. The present disclosure discloses methods and systems to automatically select one or more files for printing from a folder. The methods and systems provide a pre-defined option to select files based on user's choice and/or requirements. The pre-defined option further provides various options to user based on which the user provides input. Based on the user input, the files are identified/searched, shortlisted and automatically selected for printing. As a next step, the selected files are sent for printing to a printer or a multi-function device or any device having printing capabilities.

Exemplary Environment

FIG. 1A shows an exemplary environment 100 in which various embodiments of the disclosure can be practiced. As shown, the environment 100 includes a computing device 102 communicatively coupled to a printer 110. The printer 110 performs the functionality of printing but other functions such as scanning, imaging, copying may be performed. In place of the printer 110, the environment 100 may include a multi-function device, a multi-function printer, a multi-function peripheral device or the like. The computing device 102 includes a print driver 106. Examples of the computing device 102 may include, but are not limited to, a computer, a laptop, a smart phone, a mobile phone, a tablet computer, a smart watch, a PDA (Personal Digital Assistant), and so forth. The computing device 102 may be coupled to the printer 110 via a network (not shown). Examples of the network may include such as, but are not limited to, a personal area network (PAN), a local area network (LAN), a Bluetooth® network, a storage area network (SAN), a home area network (HAN), the Internet®, a campus area network (CAN), a wide area network (WAN), a metropolitan area network (MAN), a virtual private network (VPN), an enterprise private network (EPN), a global area network (GAN), public switched telephone network (PSTN), cellular telephone network, or any other terrestrial or satellite network appropriate.

A user 104 uses the computing device 102 for performing his daily tasks such as emails, surfing, chatting, social networking or the like. The user 104 uses the computing device 102 for giving print commands via a number of applications running on the computing device 102, such as Microsoft (MS) word, MS Excel, MS PPT, or the like. The user 104 also uses the computing device 102 for receiving data such as documents from the printer 110. The computing device 102 includes the print driver 106 that allows the applications to submit print commands and/or documents for printing. The print driver 106 may convert the data to be printed to a suitable format that the printer 110 can understand. The print driver 106 may be a software, hardware or a combination of these.

In operation, the user 104 opens a folder having at least one file that the user 104 wishes to print. The folder includes multiple files. The folder may be on the computing device 102 or may be present over a network location accessible by the computing device 102 or by the print driver 106 of the computing device 102. Upon opening, the user 104 submits a print command through the print driver 106. Upon receiving the print command, the print driver 106 provides a pre-defined option to select files of his choice. The pre-defined option further includes one or more choice options enabling the user 104 to select the files of his choice. The user 104 selects a choice option and provides choice input corresponding to the selected choice option. The print driver 106 receives the selection and the choice input from the user 104. Based on the received input, the print driver 106 performs searching and identifies files that matches with the user provided input. The print driver 106 shortlists the files and automatically selects the files for the user 104. The print driver 106 then displays automatically selected files to the user 104 for his confirmation. The user 104 can confirm. For example, the user 104 may select more files he wishes to add to the automatically selected files. The user 104 may deselect any file that he wishes to remove from printing. Once confirmed, the print driver 106 sends the automatically selected files to the printer 110 for printing. The printer 110 directly prints the automatically selected files.

Figure 1B:
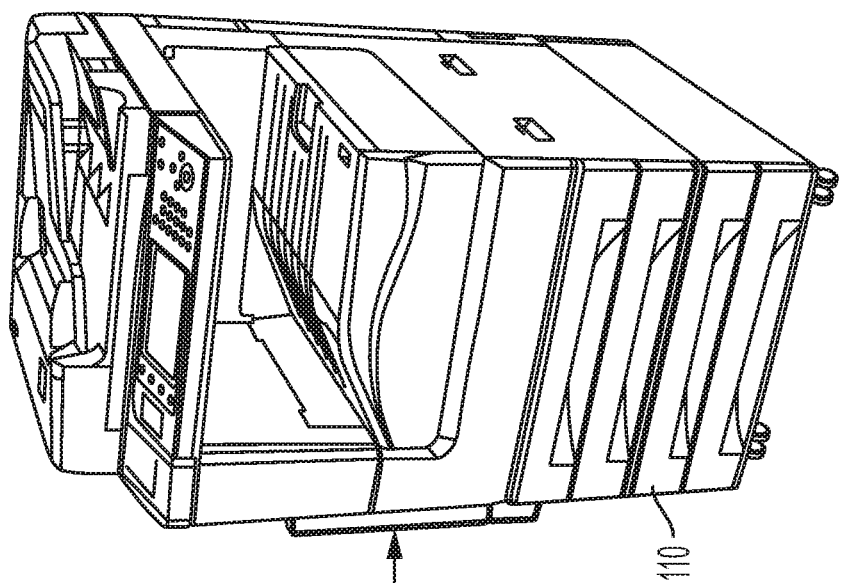
Figure 1B:
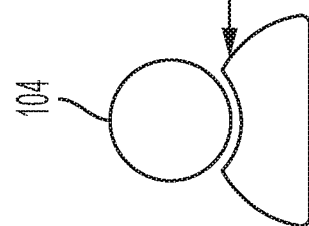
Figure 1B:

In the embodiment of FIG. 1A, the at least one file to be printed is placed in a folder that is accessed using the computing device 102. But the folder having the at least one file may be present in a memory of the printer 110 or in an external storage device such as a hard drive, a USB or the like. In such embodiments, the user 104 directly accesses the printer 110 as shown in FIG. 1B. The printer 110 performs all functionalities as discussed above with respect to the print driver 106. FIG. 1B shows another exemplary environment 112 for implementing the present disclosure. The environment 112 includes the printer 110. It can be considered that the folder is present in the memory of the printer 110. The user 104 accesses the memory of the printer 110 and opens the folder. The folder includes the at least one file to be printed and includes other multiple files. Upon opening, the user 104 submits a print command at the printer 110. Upon receiving the print command, the printer 110 provides a pre-defined option to the user 104 to select files of his choice. The pre-defined option further includes one or more options enabling the user 104 to select the files of his choice. The user 104 selects an option and provides choice input corresponding to the selected option. The printer 110 receives the selection and choice input from the user 104. Based on the received input, the printer 110 performs searching and identifies files that matches with the user provided input. The printer 110 shortlists the files and automatically selects the files for the user 104. The printer 110 then displays automatically selected files to the user 104 for his confirmation. The user 104 can confirm. For example, the user 104 may select more files he wishes to add. The user 104 may deselect any file that he wishes to remove from printing. Once confirmed, the printer 110 directly prints the automatically selected files.

In other scenarios, the folder may be present in an external storage device such as a hard disk, a USB or the like. In such cases, the user 104 may connect the external storage device to the computing device 102 or may connect the external storage device to the printer 110. Once connected, the user 104 accesses and opens the folder. After opening, the user 104 submits a print command. After submitting the print command, a pre-defined option is provided to the user 104 and thereafter all steps as discussed in FIG. 1A or FIG. 1B will be implemented.

The folder may include a plurality of files. Of the plurality of files includes at least one file to be printed. The plurality of files may be in any suitable formats such as PDF, MS word, etc. and may include content in any desired format. Each file may be associated with a name to identify the file. Similarly, the folder may be associated with a name.

Figure 2:
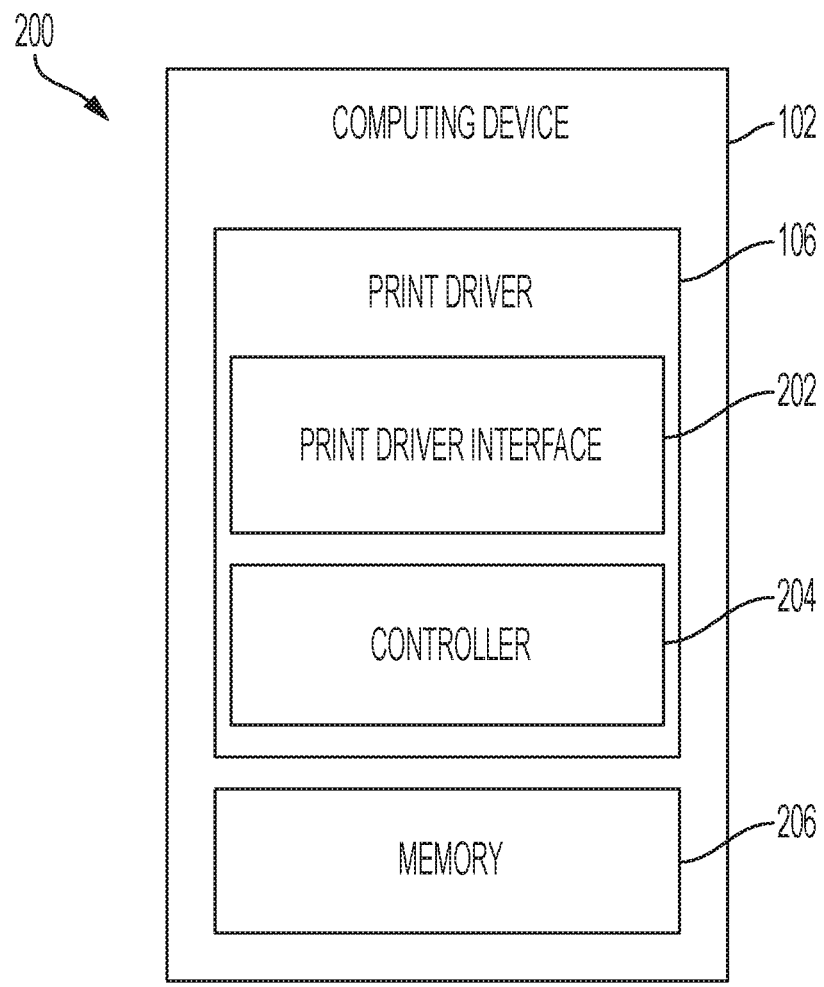
FIG. 2 is a block diagram illustrating various components of a computing device, in accordance with an embodiment of the present disclosure.

FIG. 2 is a block diagram 200 illustrating various components of an exemplary computing device 102, in accordance with an embodiment of the present disclosure. Reference to FIGS. 1A and 1B can be made while discussing FIG. 2. The computing device 102 may be communicatively coupled to a printer (although not shown but FIG. 1A can be referred). As shown, the computing device 102 includes a print driver 106 having a print driver interface 202, and a controller 204. The computing device 102 includes a memory 206 to store a number of files, instructions, user data, and so forth. Each of the components 202-206 is connected to each other via a conventional bus or a later developed protocol. Further, each of the components communicates with each other for performing various functions of the current disclosure.

A user uses the computing device 102 for a number of reasons such as work, business, etc. Initially, the user accesses or opens a folder having multiple files. The folder includes at least one file to be printed. But the folder may include multiple files to be printed. The folder may be located in the memory 206 of the computing device 102. The folder may be present in an external storage device such as a USB (Universal Serial Bus) device, an external hard disk, and so forth, connected to the computing device 102.

At the time of accessing the folder by the user, the print driver 106 receives a selection of the folder from the user. The folder includes a plurality of files. The user may wish to print a single file from the plurality of files, or the user may wish to print multiple files from the plurality of files. The user selects the plurality of files and submits a print command. The print driver 106 receives the selection and the print command from the user. Upon receiving the print command, the print driver interface 202 is provided to the user. The print driver interface 202 provides/displays a pre-defined option to the user. The pre-defined option allows the user to select files by choice. The print driver interface 202 further displays one or more choice options based on the selection of the pre-defined option. Examples of the choice options include "select file by date," "select file by content," "select file by type," "select file by keyword," and so forth. The one or more user choice options further include an approximate match option and an exact match option. The one or more choice options may be provided as a text box to add user's choice input for searching keywords, alternatively, the one or more choice options may be provided as a drop down with values like date, size, type of a file, etc. The user may select more than one choice option, for example, "select file by date" and "select file by content." The user then submits one or more choice inputs corresponding to the one or more choice options. Various examples of the choice inputs include at least one of one or more keywords, a condition, a type of file, a date, a day, a size, a content of file or the like. The user may provide one or more choice inputs as per the requirement or his choice. The print driver interface 202 receives the one or more choice inputs as submitted by the user.

The print driver interface 202 receives the choice inputs from the user and submits the choice inputs to the controller 204. The controller 204 performs searching in the folder based on the choice inputs provided by the user. The controller 204 automatically identifies and automatically selects one or more files based on the one or more choice inputs by searching in the plurality of files. The controller 204 compares values of the one or more choice inputs with the plurality of files present in the folder. The comparison may be performed based on an approximate match or an exact match option as provided by the user. Based on the comparison, the controller 204 shortlists the one or more files in the folder. Here, the controller 204 automatically identifies and automatically selects the one or more files for the user. The automatically selected files include the files that matches with the choice inputs provided by the user. The controller 204 highlights the one or more automatically selected files for the user. The files may be highlighted using a color, a font size, a font type, and so forth. The controller 204 interacts with the print driver user interface 202 for display. The controller 204 retrieves the one or more files after searching. The controller 204 identifies and selects files that are printable by the printer 110.

The print driver interface 202 displays the one or more automatically selected files along with other non-selected files present in the folder. The print driver 106 prompts the user to confirm the one or more automatically selected files for printing, wherein the user provides a confirmation input for printing based on the review of the one or more automatically selected files. In some embodiments, while reviewing, the user may manually select at least one file other than the one or more automatically selected files for printing. For example, the user may select any additional file from the non-selected files displayed to the user. In alternative embodiments, while reviewing, the user may manually deselect at least one file from the one or more automatically selected files when the at least one file is not being considered in accordance with the one or more choice inputs or other reasons.

Upon receiving the confirmation, the controller 204 sends the one or more automatically selected files for printing to the printer 110. The printer 110 receives the one or more automatically selected files from the print driver 106 and finally prints the received selected files. The user 104 can collect the printed files from the printer 110.

EXAMPLES

The print driver 106 reads all the plurality of files and selects only files matching the one or more choice inputs provided by the user. In an example, if the user provides a keyword such as "Unix," then the print driver 106 selects one or more files including a keyword like "Unix" as provided by the user. The print driver 106 searches for the keyword "Unix" in the plurality of files and selects and highlights the one or more files including the keyword "Unix." The user may further provide an input whether he/she wants the print driver 106 to search in content or just in file names. Further, the user may provide an input an approximate match or an exact match option for the selected choice option. Based on all the choice inputs by the user, the files are automatically selected.

In another example, the user may want to print files of a particular user such as a "user1." In such cases, the user may provide a choice input such as "user1" to be looked into the content of the file. In further example, the user may provide a date for example, print all files after a date DD/MM/YYYY. The date may be in any suitable format like, but not limited to, DD/MM/YYYY, MM/DD/YYYY, YYYY/MM/DD, and so forth. In furthermore example, the user may enter his/her choice input such as a file type, for example, print all PDF files. The user may also provide choice input such as a file name containing a specific word for example, print all documents of User1 where the files are named as User1_xx, 123_User1. In further example, the user may provide the choice input as an Author for example, print all documents created by UserX. These are a few examples; other choice options may be implemented. Based on the choice inputs from the user, the print driver 106 automatically searches for choice inputs in filename and/or content of the plurality of files and automatically selects one or more files for printing.

In a further example, it is considered that a folder named "certificates" includes different certificates of multiple users like certificate of high grade, doctorate, etc., of different users. All these certificates are placed randomly in the folder. Now, the user wants to print certificate of doctorate of all the users. The user selects all the files in the "certificates" folder and gives a print command. The print driver 106 opens print properties and a provides pre-defined option such as "select by choice." The print driver 106 asks the user to provide choice input(s). The user enters that keywords or a statement like doctorate certificate of all the users. The print driver 106 automatically reads all the certificates present in the folder and selects only doctorate certificates of all the users and displays to the user. The user checks and confirms, based on the confirmation from the user, the selected files including the doctorate certificates of all users are sent for printing to the printer 110.

For simplicity, an example is discussed. The user opens a folder including all the files and selects all the files and gives a print command. The print driver opens print driver properties, the user selects an option "Select by choice" that have different choice options to add user's choice. The option may be "select file by choice," or the like. The user's choice may be provided as a text box to add user's input for searching keywords or drop-down lists with values like "date," "size," "type," etc, to let the print driver select and accordingly print based on the selection. After this, the user makes the choice by providing the choice inputs, the print driver selects files that matches with the choice input by searching the value. The print driver then asks the user for confirmation to print the selected files. Once confirmed, the print driver sends the files to the multi-function device or the printer for printing with other print settings programmed if needed. The choice selection can be done with following get values: 1) Keyword—providing a word from the files' content, for example, print all documents of USER1 with user1 word available in the content of the file; 2) Date—For example, print all the bill receipts after a date 20/May/2018; 3) File type—for example, print all pdf files; 4) File name containing specific word, for example, print all documents or files of USER1 where the files are named as USER1_xx, 123_User1; 5) Author—For example, print all documents or files created by a UserX.

Exemplary Screenshots

Figure 3:
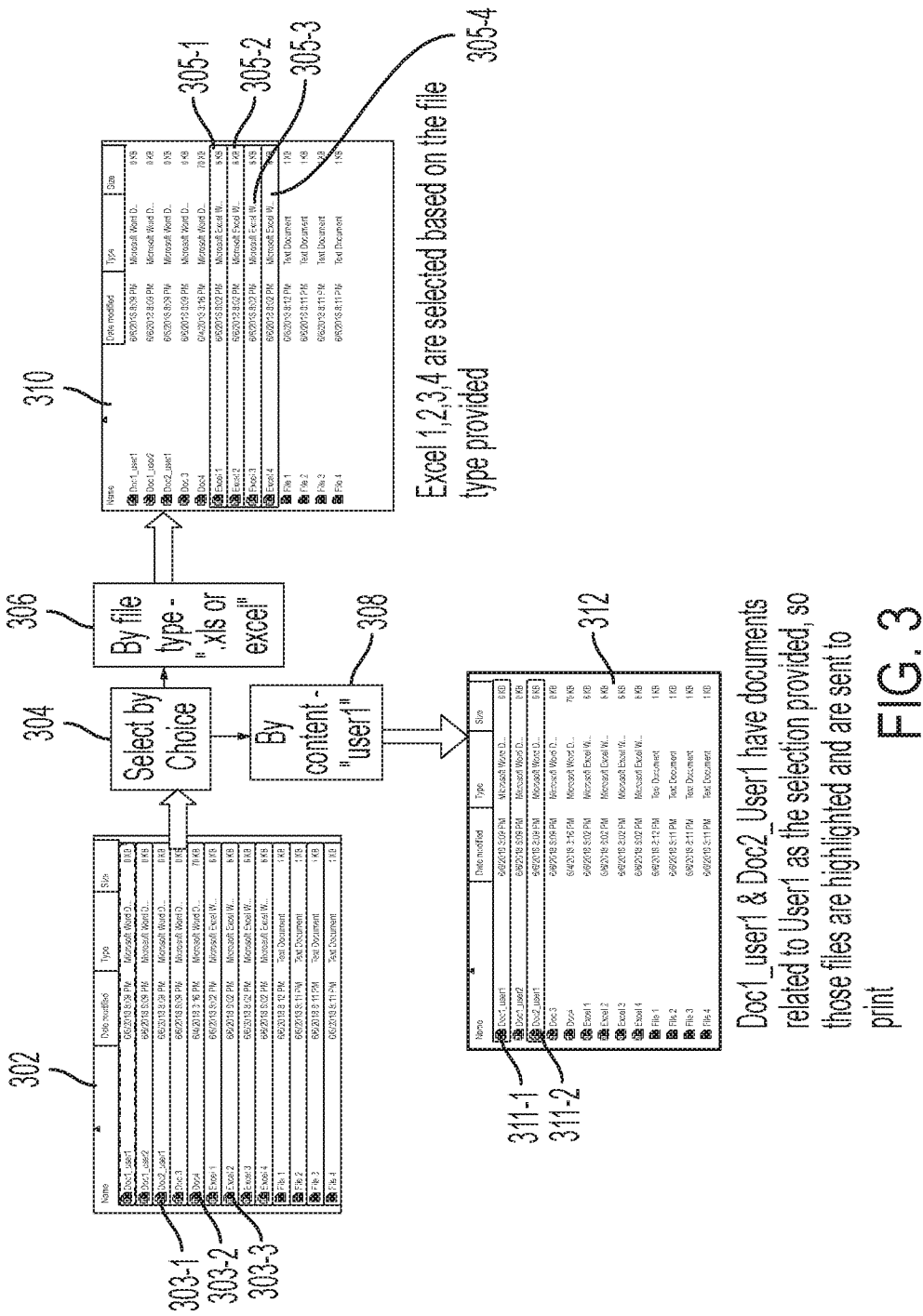
FIGS. 3, and 4A-4C show exemplary snapshots for implementing the current disclosure.

A number of screenshots are shown for better understanding of the disclosure. The screenshot 302 of FIG. 3 shows a folder having a plurality of files such as 303-1, 303-2, 303-3 and so on (collectively 303). The screenshot 302 further shows the plurality of files is selected by the user. Upon selecting all the files 303, the print driver shows a predefined option "select by choice" 304 to the user. The user selects the option 304 "select by choice". Upon selecting the option 304, one or more choice options such as 306 and 308 are displayed. The choice option 306 allows the user to select files by file type such as ".xls or excel." The choice option 308 allows the user to select files by content such as "user1."

When the user selects the choice option 306, the user further provides choice input such as ".xls" or "excel." Based on the choice input, the controller searches and selects one or more files based on a file type ".xls or excel." The controller searches and automatically selects four files marked as 305-1, 305-2, 305-3 and 305-4 (collectively 305) from the plurality of files 303 shown in the screenshot 310. The screenshot 310 shows four files 305 named as Excel1 (305-1), Excel2 (305-2), Excel3 (305-3), Excel4 (305-4) matches with the user choice input. The user reviews the files and the files are sent to the printer after review.

In another scenario, when the user selects the option 308, the user further provides the choice input as "user1." The controller searches and automatically selects two files from the plurality of files as shown in the screenshot 312. The screenshot 312 shows two files 311-1 and 311-2 (collectively 311) named as doc1_user1 and doc2_user1. The user reviews these two files 311 and send to the printer after review.

Figure 4A:
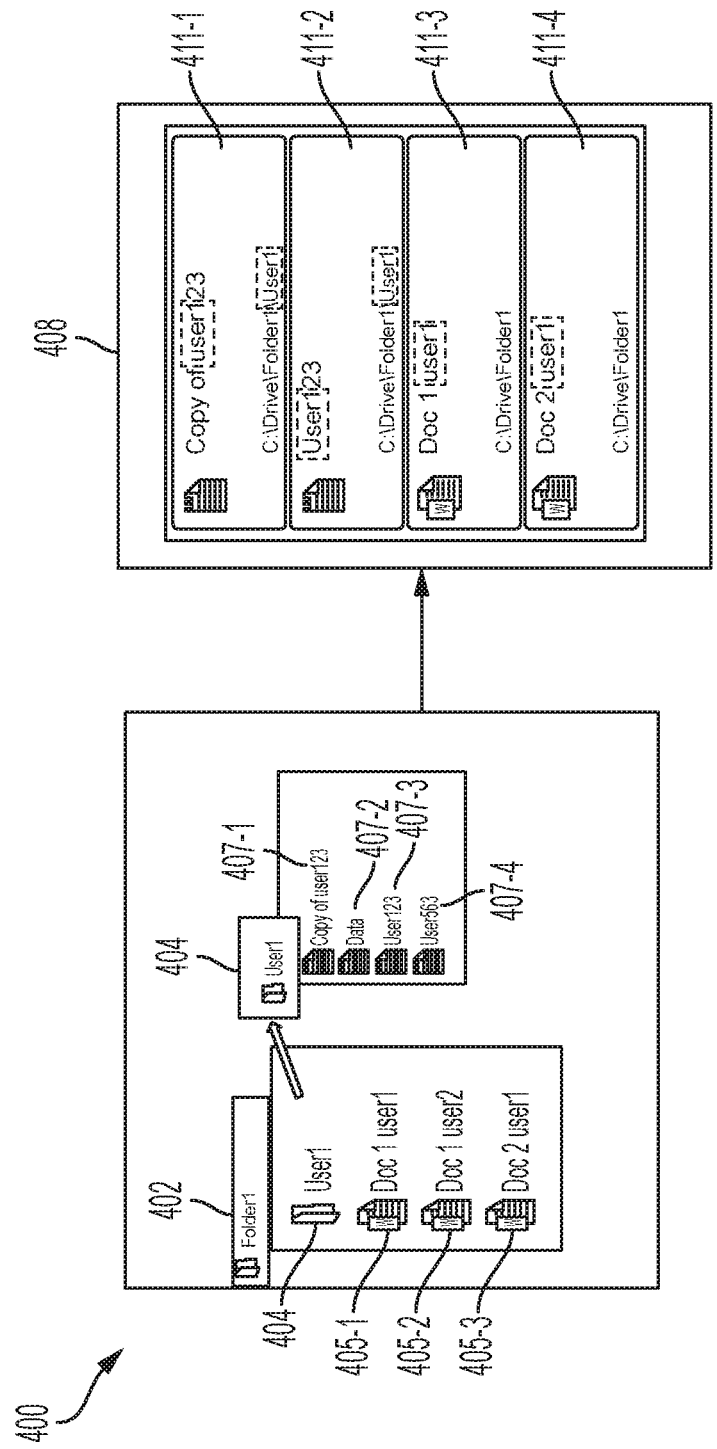

More number of screenshots are discussed herein. One such screenshot 400 is displayed in FIG. 4A. According to the screenshot 400, the folder named as "folder1" 402 includes a sub-folder named "user1" 404 and a number of files such as 405-1, 405-2, and 405-3 (collectively 405). The sub-folder "user1" 404 further includes files such as 407-1, 407-2, 407-3, and 407-4 (collectively 407). The folder 402 is the one from which the user wishes to select files and send for printing. According to the screenshot 400, it is considered that the user inputs a keyword "user1." Meaning all files that have user1 as the keyword in the content of the files 405 or 407, or in the file names are searched. In the embodiment of FIG. 4A, the print driver performs an approximate match, where the keyword user1 may be prefixed or suffixed by other keywords. Based on the searching, the matching files 411-1, 411-2, 411-3, and 411-4 are shown in the screenshot 408 of FIG. 4A.

Figure 4B:
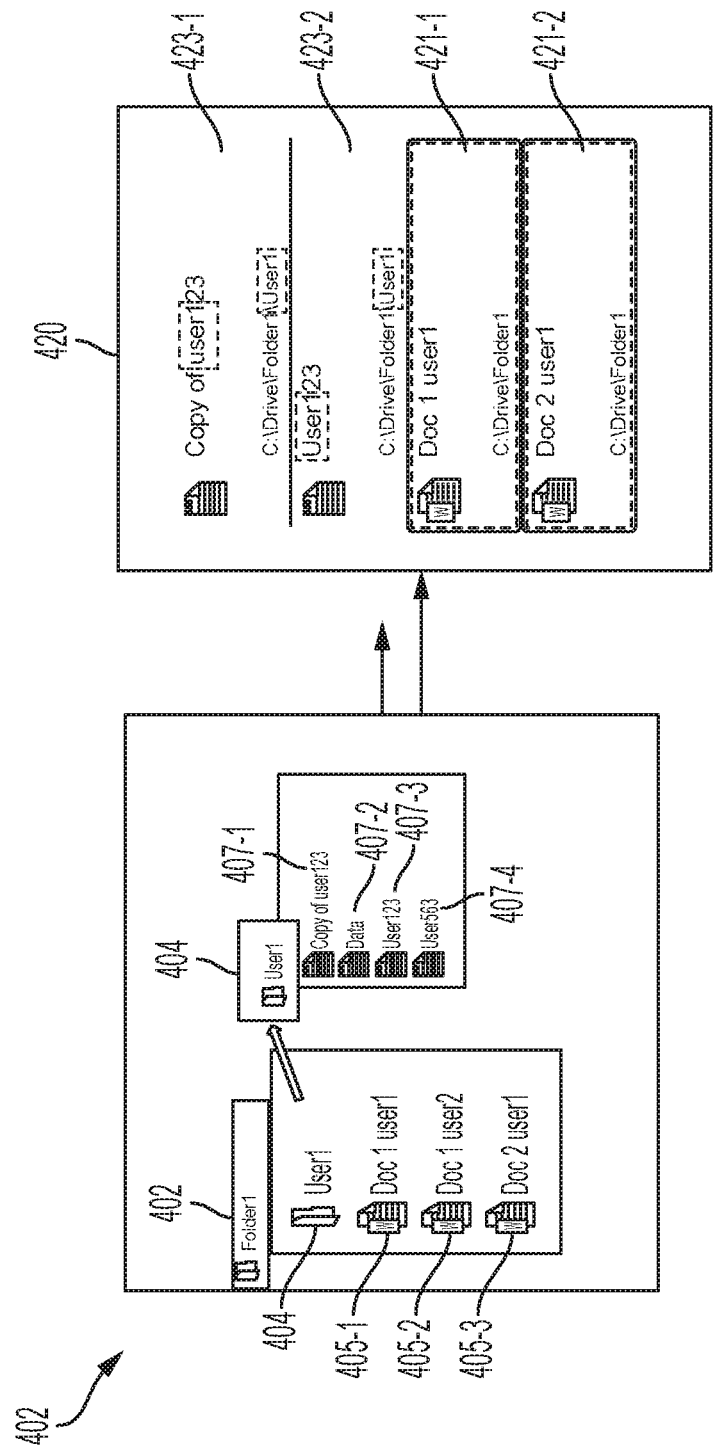

In other embodiment, the print driver performs an exact match and resulting files are shown in the screenshot 420 of FIG. 4B. In this embodiment, the print driver performs an exact match, where the keyword "user1" may be searched exactly. For example, the matching files include "doc 1 user1" (marked as 421-1) and "doc 2 user1" (marked as 421-2). The files 421 include all the files having exact keyword "user1" in its filename or in the content. The matching files are shown as automatically selected, the selection is shown by dark grey area. The other non-selected files are also displayed along with the automatically selected files but are not a part of the selection. For example, files "copy of user123" (marked as 423-1), "user123 (marked as 423-2) are not selected (i.e., non-selected files). The approximate match option selects all files that have the keyword, while the exact match option selects only the file that exactly matches the keyword. Any of the options can be set as default options.

Figure 4C:
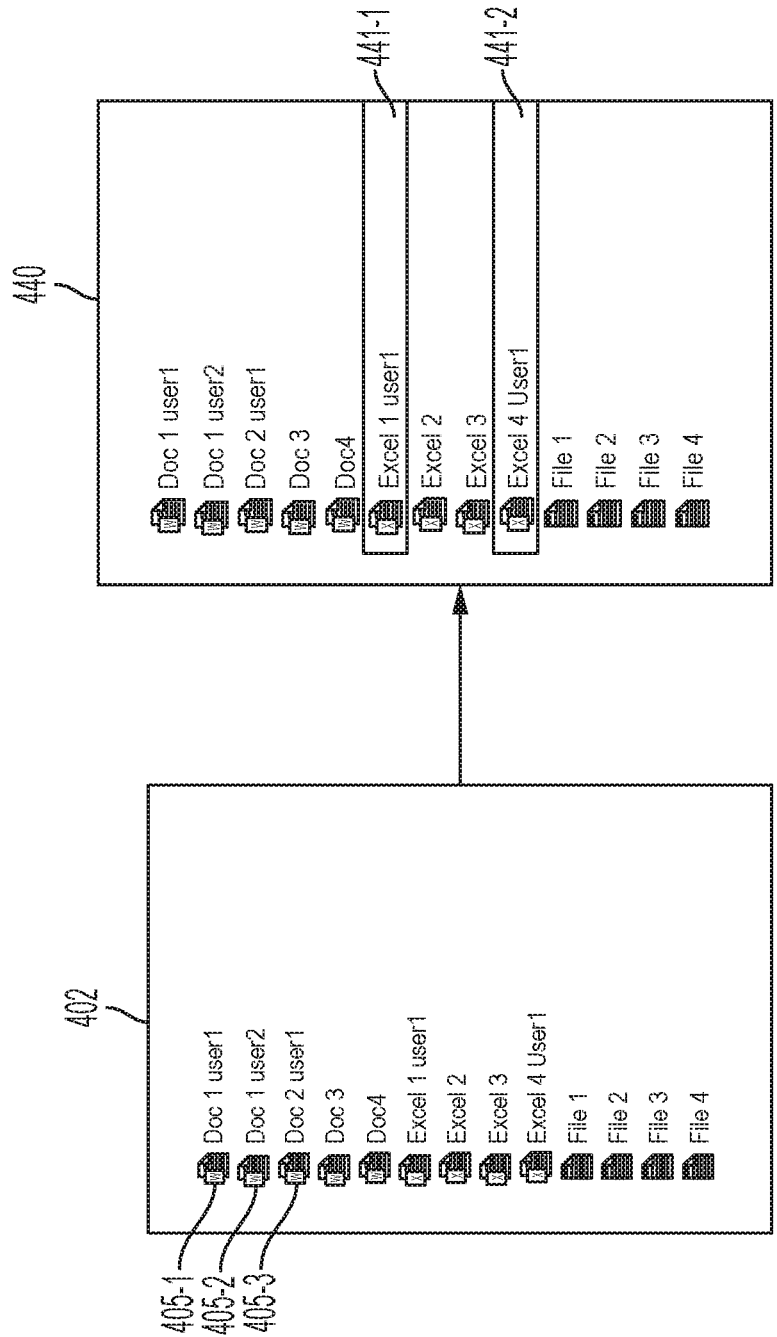

In the embodiment of FIG. 4C, an expanded view of the folder "folder1" 402 is shown. As shown, the folder 402 includes multiple files 405-1, 405-2, 405-3 (collectively 405), and so forth. Here, the user provides multiple choice inputs, for example, the user provides "user1" and ".xls" file type in keywords as choice inputs on the print driver interface. The print driver searches with multiple keyword match in the files 405. The print driver searches for matching files having "user1" and ".xls" file type in content/filename for printing. The print driver searches and selects a match based on the "user1" and the ".xls" file type. As shown in a screenshot 440, the print driver lists and displays all files that have "user1" and are ".xls" type of file. As shown in the screenshot 440, the files 441-1 and 441-2 (collectively 441) are automatically selected for printing. The files include all the files having "user1" and are ".xls" type of file. The automatically selected files 441 include "Excel1 User1" (441-1) and "Excel4 User1" (441-2) that have "user1" word in it and are also ".xls" type of files.

Exemplary Flowchart

Figure 5A:
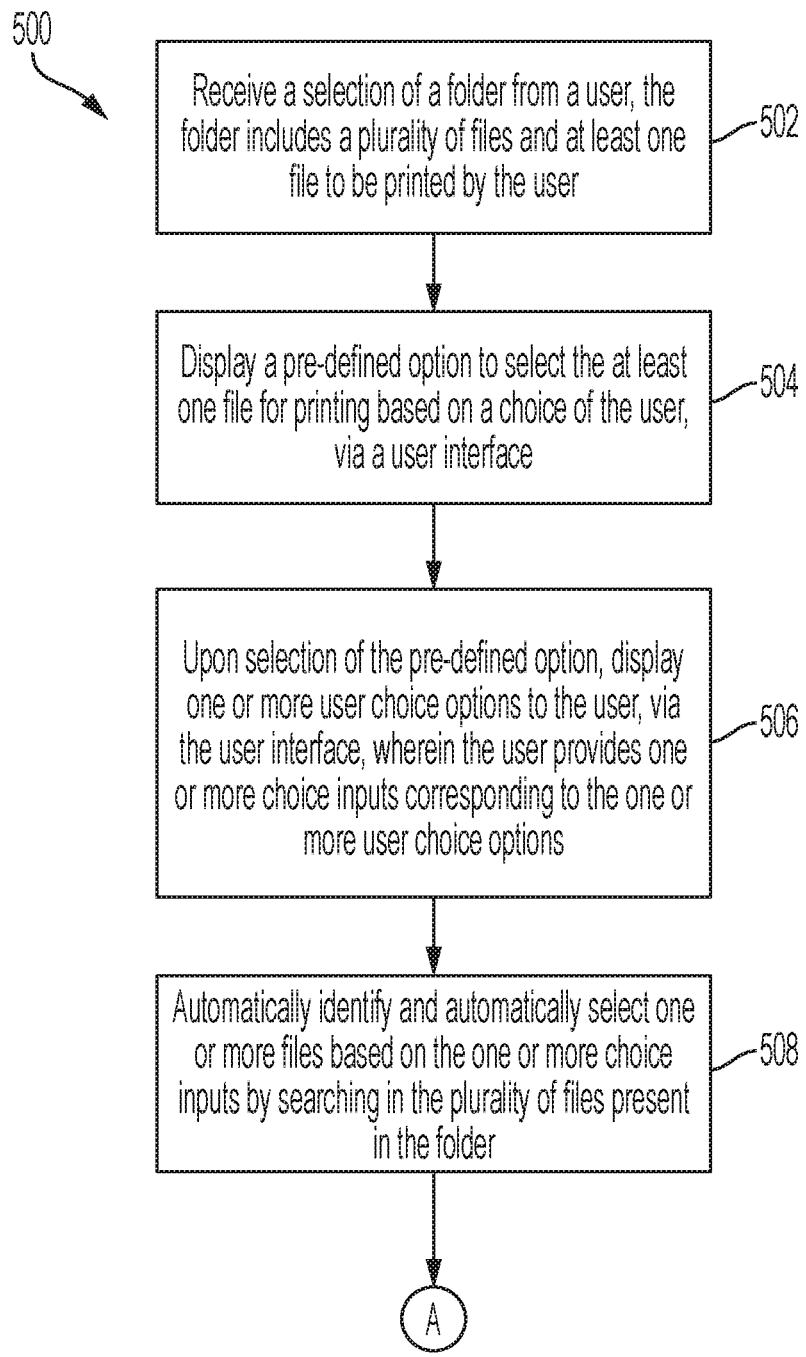
FIGS. 5A-5B represent a flowchart for automatically selecting one or more files from a folder, for printing.
Figure 5B:
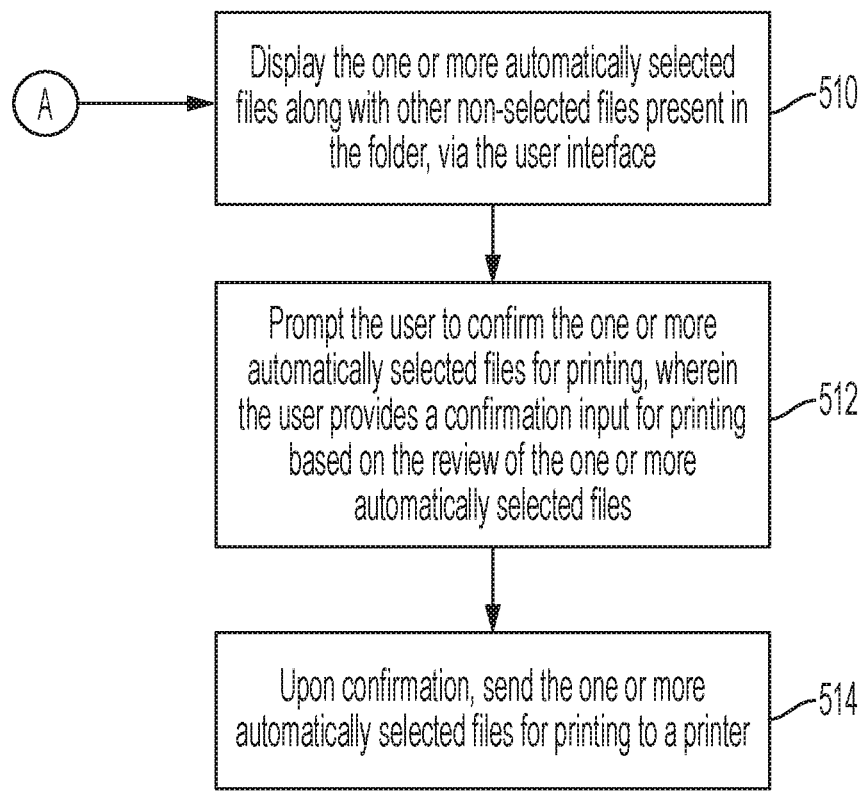
Figure 6A:
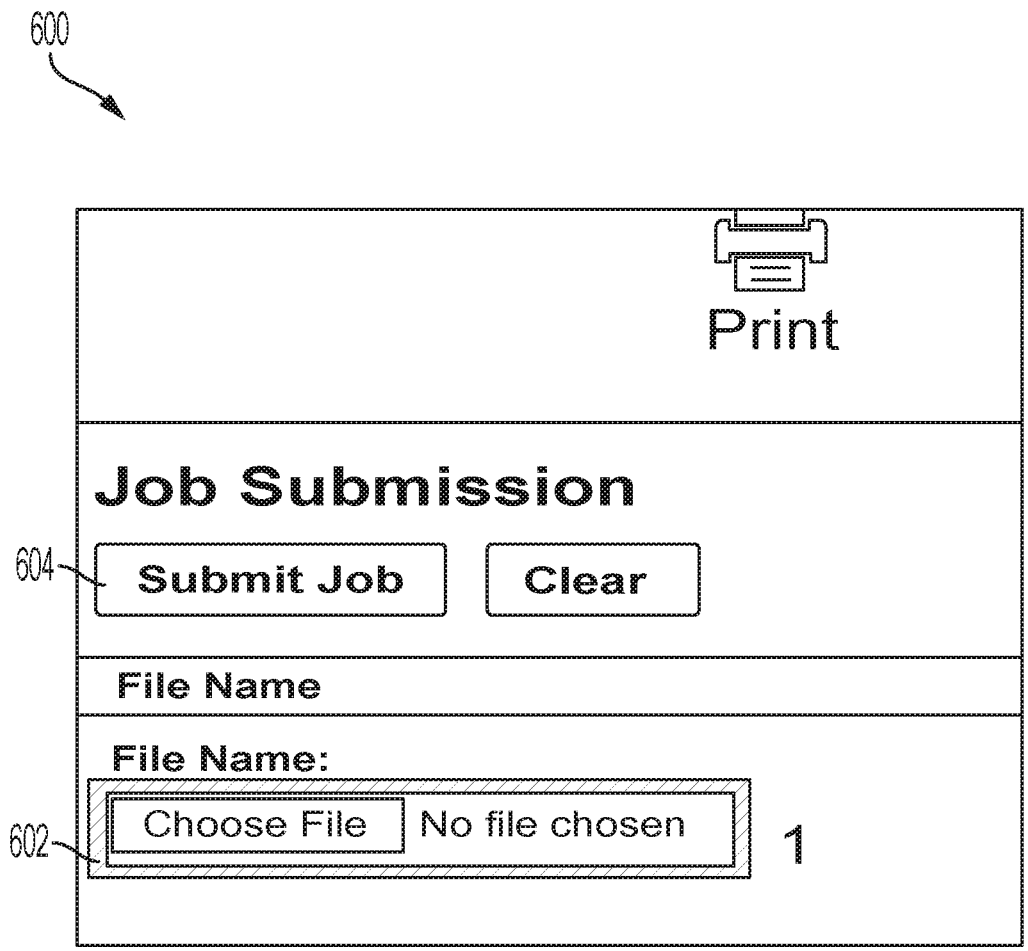
Figure 6B:
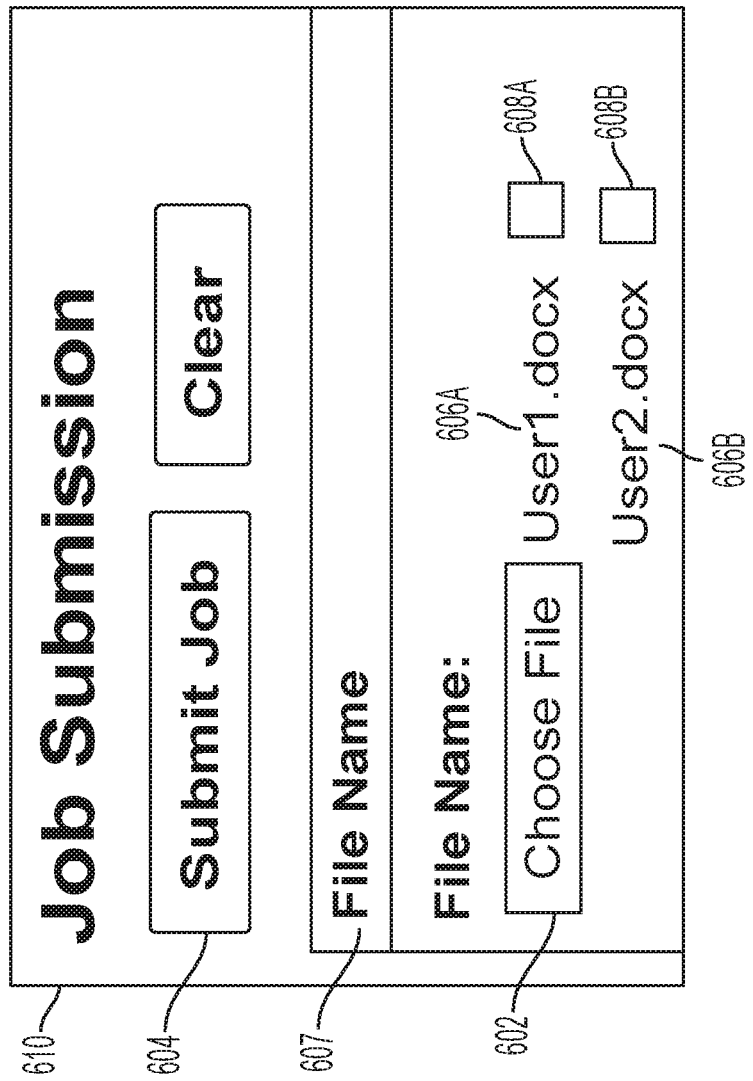
FIG. 6B shows an exemplary snapshot according to the implementation of the present disclosure.

FIGS. 5A and 5B represent a method flowchart 500 for automatically selecting one or more files from a folder for printing. The method 500 may be implemented by a print driver typically running on a computing device. The method 500 may be implemented by a printer. The method 500 may be implemented by a user interface of any device having printing capability or submitting print commands capability. The method 500 may be implemented in the form of a non-transitory computer-readable medium. The non-transitory computer-readable medium implementing the subject matter includes instructions executable by a processing resource. The instructions are executed to implement all method blocks of the flowchart 500 that will be discussed below in greater detail. Although the method 500 is discussed with respect to the print driver running on the computing device, where all method blocks are implemented by the print driver or components of the print driver. But it is understood that the method 500 can be implemented for other scenarios without limiting the scope of the disclosure. In such cases, for example, the method blocks may be implemented by the printer.

The method 500 begins with when a user wishes to print some files or a single file from a folder having a plurality of files. Considering the plurality of the files present in the folder, it is typically difficult for the user to search the file(s) for printing, and to overcome such difficulty, the method 500 is implemented.

The user opens/accesses/selects a folder having the plurality of files. The folder includes at least one file to be printed by the user. The at least one file belongs to the plurality of files present in the folder. The folder may include one or more sub-folders having files. The folder may be accessible by the user using the computing device of the user. For example, the folder may be present in a memory of the computing device. In another example, the folder may be present in an external storage device such as a hard disk communicatively coupled to the computing device. The folder may be present over a network location (the Internet, intranet, or others) accessible by the computing device. The folder may be present such that it can be accessible by the computing device. Alternatively, the folder may be accessible by the printer. For example, the folder may be present in a memory of the printer. In another example, the folder may be present in the external storage device that can be accessible by connecting the external storage device to the printer.

At 502, a selection of the folder from the user is received. Upon selection, the user selects the plurality of files and submits a print command. The selection of the plurality of files present in the folder and the print command from the user, is received. Upon receiving, at 504, a pre-defined option is displayed to the user via a user interface of the print driver. The pre-defined option includes "select by choice." The user selects the pre-defined option. The selection of the pre-defined option enables the user to select the at least one file for printing based on his choice and/or other requirements without requiring any manual effort and time. The pre-defined option further includes one or more choice options for the user. Various examples of the choice options include select file by keyword, select file by date, select file by a condition, select file by a type of file, select file by a date, select file by a day, select file by a size, select file by content of file or other selection criteria. These are exemplary choice options, other choice options may be implemented. The user can select any of the choice options based on his choice and/or requirement. For example, if the user selects the choice option "select file by keyword," then the user provides keyword for searching. In another example, if the user selects the choice option "select file by date," the user provides a specific date as choice input for searching. Similarly, based on the selection of the choice option, the user provides corresponding choice inputs.

Upon selection of the pre-defined option, at 506, the one or more user choice options are displayed to the user, via the user interface. The user provides one or more choice inputs corresponding to the one or more user choice options. The one or more choice inputs provided by the user are received. After receiving the choice inputs, processing starts. At 508, based on the one or more choice inputs, one or more files are automatically identified and automatically selected by searching in the plurality of files present in the folder. The searching includes comparing values of the one or more choice inputs with the plurality of files present in the folder. The comparison is performed based on at least one of an approximate match option and an exact match option. In the approximate match option, all files having the relevant keyword are considered. For example, if the provided keyword is user1, then all files having file name such as 123user1, user1 doc, user1 are considered. While in the exact match option, all files having the exact relevant keyword are considered. For example, if the provided keyword is user1, then files having the exact keyword user1 are considered such as filename "user1." And other files having names such as 123user1, user1 doc are not considered. The searching may be performed in the file name or in the content of the file. Based on the comparison, the one or more files matching the user choice inputs are shortlisted. While searching, the files that are printable files are considered/shortlisted. For example, files such as exe file, config .msi file, etc., may not be considered for shortlisting. The files such as MS word, MS ppt, MS Excel, PDF, or other printable file formats are considered and shortlisted. After this, the one or more shortlisted files are automatically selected for the user. Thereafter, the one or more automatically selected files are highlighted. The automatically selected files include the files that match with the one or choice inputs provided by the user. At 510, the one or more automatically selected files are displayed along with other non-selected files present in the folder, via the user interface. Then, at 512, the user is prompted to confirm the one or more automatically selected files for printing, wherein the user provides a confirmation input for printing based on the review of the one or more automatically selected files. While reviewing the one or more automatically selected files, the user may deselect any of the automatically selected files if he wishes not to proceed with printing or finds the files are irrelevant for printing. Similarly, the user may select any of the non-selected files if he wishes to add more files to printing. In such cases, the additional selected files are considered with the one or more automatically selected files. At 514, Upon confirmation, the one or more automatically selected files are sent for printing to a printer. The printer prints the one or more automatically selected files. In this manner, the method 500 enables the user to print the at least one file from the folder having the plurality of files, without requiring manual search and selection of the at least one file.

Although the method 500 is discussed with respect to the at least one file for printing. But the user may wish to print multiple files from the folder.

In embodiments discussed above, the at least one file for printing can be selected from the folder present on the computing device or on the printer. But there are scenarios, when the at least one file can be printed via a printer's web. The printer's web provides a print option to the user to directly send certain files (or files of certain file types) to the printer for printing. In the existing print web solutions, the user is able to browse to a file/folder location and select only one file from that specific folder for printing. To print the file using print web option, a screenshot 600 is displayed. The screenshot 600 displays an option 602 that allows the user to select a single file and directly submit for printing using an option 604. However, according to the present disclosure, the user can print multiple files via the printer's web option. With the current disclosure, the pre-defined option, "select by choice" option is provided in the "Print" page of the printer's web and is provided in the form of a checkbox. And when the user selects the "select by choice" option, the browse option allows the user to browse till the parent folder and not to the exact file. Further, one or more options related to the "select by choice" option are displayed when the user selects the "select by choice" option. When the choices are provided like select only files with "User" in filename (607) to search as input choice, the search is attempted in the folder and all its subfolders. Then, the files are identified and shortlisted. The selected files matching the user's choice input are listed one by one with "select" and "deselect" option as in the screen 610. The selection and deselection option is provided in the form of a checkbox 608A, and 608B. The selection can be done by checking the box (608A, 608B) and deselection can be done by unchecking the checkbox (608A, 608B). Here the user inputs the folder name in the text box 607 and all files in the folder (or its subfolders) are displayed for selection. For example, the files 606A, 606B displayed. The user can select any of the files and submit directly for printing. For example, the user may confirm to print the files 606A and 606B. Then, the user selects the submit job option 604 to print the files 606A and 606B. But the user may confirm to print a single file 606A or 606B.

As a further example, when the user wishes to print a file such as "file1," then the user requires to browse a file, for example, (D:\Folder\File1) and select "file1" exactly. The user requires to select each individual file in conventional solutions, which is cumbersome process. But in the present disclosure, when the user wishes to print "file1", the keyword "file1" is considered. Instead of browsing to individual files, the browsing stops at the folder where the files are residing. Based on the keyword, the printer's web interface lists down all documents with "File1" with checkbox to check or uncheck based on the need to print or not respectively.

The present disclosure is implemented when a user wishes to print some files from a folder having multiple files. The disclosure is implemented when a user wishes to print a single file from a folder having multiple files. To this end, the disclosure automatically identifies and automatically selects relevant files for printing based on user's input/choice/ requirements.

The present disclosure discloses methods and systems for automatically identifying and selecting relevant files from a folder for printing based on user's input. The methods and systems allow easy searching of relevant files from the folder having multiple files of different types. The methods and systems further reduce manual intervention, effort and time to search and select files for printing. For example, the user does not require to spend time to manually search each and every file for printing from the folder having multiple files. The methods and systems facilitate a simple workflow for the user. The methods and systems further avoid duplicates and show only the files of the folder instead of the folder. The methods and systems enable the user to print the relevant files without requiring any manual effort for searching and/or sorting the files. In other words, the user does not require to spend time and effort in checking each and every file matching the user choice. In addition, the methods and systems consider files that are acceptable for printing. An option is facilitated where the user provides his choices or requirements (collectively referred to as choice inputs), the system reads all files in the folder and selects select only files that matches the user input. The system is enhanced with mechanism to handle searching.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "identifying," or "selecting," or "displaying," or "searching," or "sending," "or receiving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A computer-implemented method of selecting a file for printing, the method comprising:
    receiving, by one or more processors, a folder from a user, the folder comprising a plurality of files and at least one file to be printed by the user;
    receiving, by the one or more processors, a selection of the plurality of files present in the folder and a print command from the user;
    displaying, by the one or more processors, a pre-defined option to select the at least one file for printing based on a choice of the user, via a user interface;
    upon selection of the pre-defined option, displaying, by the one or more processors, one or more user choice options to the user, via the user interface, wherein the user provides one or more choice inputs corresponding to the one or more user choice options;
    receiving, by the one or more processors, the one or more choice inputs provided by the user;
    automatically identifying and automatically selecting, by the one or more processors, one or more files based on the one or more choice inputs by searching in the plurality of files present in the folder;
    displaying, by the one or more processors, the one or more automatically selected files along with other non-selected files present in the folder, via the user interface;
    prompting, by the one or more processors, the user to confirm the one or more automatically selected files for printing, wherein the user provides a confirmation input for printing based on the review of the one or more automatically selected files; and
    upon confirmation, sending, by the one or more processors, the one or more automatically selected files for printing to a printer,
    wherein the method enables the user to print the at least one file from the folder having the plurality of files, without requiring manual search and selection of the at least one file.

2. The computer-implemented method of claim 1, further comprising printing, by the one or more processors, the one or more automatically selected files by the printer.

3. The computer-implemented method of claim 1, wherein searching comprises comparing values of the one or more choice inputs with the plurality of files present in the folder.

4. The computer-implemented method of claim 3, wherein the comparison is performed based on at least one of an approximate match option and an exact match option.

5. The computer-implemented method of claim 1, further comprising, by the one or more processors, shortlisting the one or more files based on the comparison.

6. The computer-implemented method of claim 1, further comprising automatically selecting, by the one or more processors, the one or more files for the user, after shortlisting.

7. The computer-implemented method of claim 1, wherein the one or more automatically selected files comprise the files that match with the one or choice inputs provided by the user.

8. The computer-implemented method of claim 1, further comprising highlighting, by the one or more processors, the one or more automatically selected files.

9. The computer-implemented method of claim 1, wherein the one or more choice inputs comprise at least one of one or more keywords, a condition, a type of file, a date, a day, a size, a selection criterion, and a content of file.

10. The computer-implemented method of claim 1, wherein the one or more automatically selected files are printable files.

11. A computing device for automatically selecting at least one file of user's choice from a folder for printing, the computing device comprising:
    one or more processor configured to:
        receive a selection of the folder from the user, the folder comprising a plurality of files and the at least one file to be printed by the user;
        receive a selection of the plurality of files present in the folder and a print command from the user;
        display a pre-defined option to select files by choice to the user;
        display one or more user choice options to the user based on a selection of the pre-defined option, wherein the user provides one or more choice inputs corresponding to the one or more choice options;
        receive the one or more choice inputs provided by the user;
        automatically identify and automatically select one or more files based on the one or more choice inputs by searching in the plurality of files present in the folder;
        display the one or more automatically selected files along with other non-selected files present in the folder;
        prompt the user to confirm the one or more automatically selected files for printing, wherein the user provides a confirmation input for printing based on the review of the one or more automatically selected files; and upon confirmation, send the one or more automatically selected files for printing to a printer.

12. The computing device of claim 11, wherein searching comprises comparing values of the one or more choice inputs with the plurality of files present in the folder.

13. The computing device of claim 12, wherein the one or more processors are further configured to shortlist the one or more files based on the comparison.

14. The computing device of claim 11, wherein the one or more processors are further configured to automatically select the one or more files for the user for printing, after shortlisting.

15. The computing device of claim 11, wherein the one or more automatically selected files comprise the files that matches with the one or choice inputs provided by the user.

16. The computing device of claim 11, wherein the one or more processors are further configured to highlight the one or more automatically selected files.

17. The computing device of claim 11, wherein the one or more automatically selected files are printable files.

18. The computing device of claim 11, wherein the one or more choice inputs comprise at least one of: one or more keywords, a condition, a type of file, a date, a day, a size, a selection criterion, and a content of file.

* * * * *